Figure 1:
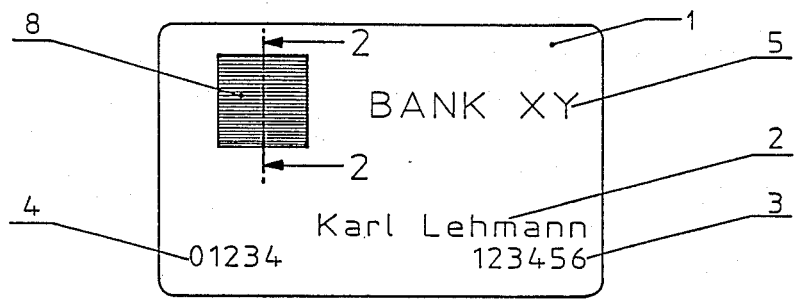

United States Patent [19]

Becker et al.

[11] Patent Number: 4,765,656
[45] Date of Patent: Aug. 23, 1988

[54] DATA CARRIER HAVING AN OPTICAL AUTHENTICITY FEATURE AND METHODS FOR PRODUCING AND TESTING SAID DATA CARRIER

[75] Inventors: Wolfgang Becker, Neubiberg; Alexander Hierweger, Rottach-Egern; Hansjürgen Merkle, Munich; Erwin Lob, Munich; Joseph Lass, Munich; Wittich Kaule, Emmering, all of Fed. Rep. of Germany

[73] Assignee: GAO Gesellschaft fur Automation und Organisation mbH, Munich, Fed. Rep. of Germany

[21] Appl. No.: 918,921

[22] Filed: Oct. 15, 1986

[30] Foreign Application Priority Data

Oct. 15, 1985 [DE] Fed. Rep. of Germany ....... 3536739

[51] Int. Cl.[4] .............................................. B42D 15/00
[52] U.S. Cl. ........................................ 283/70; 283/91; 283/904
[58] Field of Search .................... 283/904, 81, 91, 95, 283/70, 67

[56] References Cited

U.S. PATENT DOCUMENTS

| | | | |
|---|---|---|---|
| 4,250,393 | 2/1981 | Greenaway | 283/90 X |
| 4,417,784 | 11/1983 | Knop et al. | 283/91 X |
| 4,632,430 | 12/1986 | Wicker | 283/904 X |

FOREIGN PATENT DOCUMENTS

| | | |
|---|---|---|
| 0105099 | 4/1984 | European Pat. Off. . |
| 2555214 | 12/1975 | Fed. Rep. of Germany . |
| 2907004C2 | 6/1981 | Fed. Rep. of Germany . |
| 3151407C1 | 10/1983 | Fed. Rep. of Germany . |
| 3425263A1 | 1/1985 | Fed. Rep. of Germany . |
| 3311882A1 | 2/1985 | Fed. Rep. of Germany . |
| PCT/US82/-00587 | 6/1982 | PCT Int'l Appl. . |
| 2044175B | 10/1980 | United Kingdom . |
| 2111910B | 7/1983 | United Kingdom . |

*Primary Examiner*—Paul A. Bell
*Attorney, Agent, or Firm*—Bacon & Thomas

[57] ABSTRACT

The present invention relates to a data carrier (identification card, bank card, credit card, etc.) in which information is provided in an inner volume area by means of a laser beam, the information being visible in the form of changes in the optical properties of the carrier material due to an irreversible change in the material caused by the laser beam and to a method for producing the data carrier and for testing it.

47 Claims, 6 Drawing Sheets

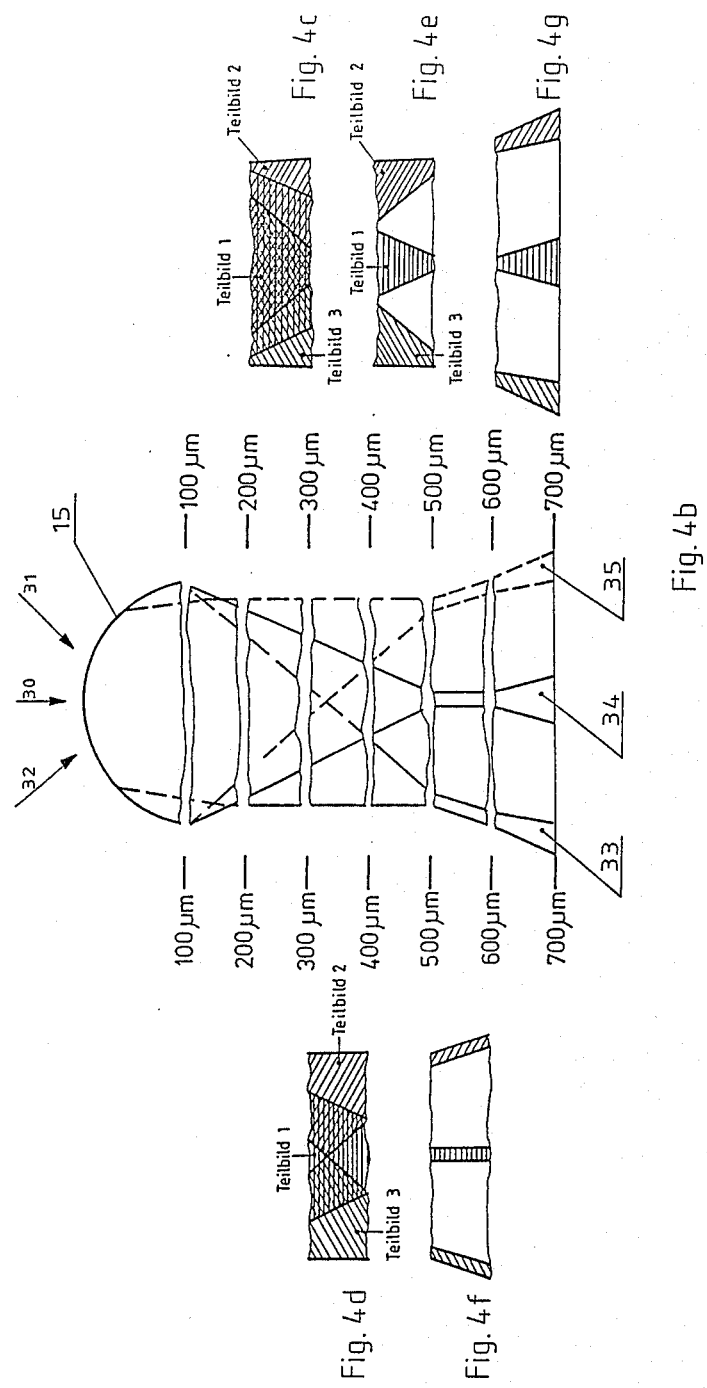

DATA CARRIER HAVING AN OPTICAL AUTHENTICITY FEATURE AND METHODS FOR PRODUCING AND TESTING SAID DATA CARRIER

The present invention relates to a data carrier in which information is provided in an inner volume area by means of a laser beam, said information being visible in the form of changes in the optical properties due to an irreversible change in the material caused by the laser beam, and to methods for producing and testing said data carrier.

Data carriers such as identification cards, credit cards, bank cards, cash payment cards and the like, are used increasingly in a great variety of service sectors, for example in cashless transfers and within enterprises. Due to their widespread use they are, on the one hand, typical mass-produced articles; their manufacture, i.e. the production of the card structure and the addition of the card-individual user data, must be simple and inexpensive. On the other hand, the cards must be designed in such a way as to be protected as well as possible against forgery and falsification. The many kinds of identification cards already on the market or still in the development stage show the efforts of the relevant industry to optimize these two contrary conditions.

German patent No. 29 07 004 discloses an identification card which fulfils the above-mentioned conditions. The method for manufacturing this known card is characterized in that the person-related data are inscribed in the finished, laminated card by means of a laser beam. The card comprises an opaque card inlay which is enclosed between transparent cover layers. The writing process is performed through the transparent cover film. This considerably simplifies manufacture, on the one hand, since, for instance, no further production steps are required following personalization, and increases protection against forgery and falsification, on the other hand, since, for example, the data are present in an inalterable form due to the destruction of material caused by the laser beam. If the laser intensity is selected appropriately, writing on the inlay allows for a simultaneous congruent marking in the volume of the cover film extending as far as its surface. The personal data are then present congruently in different card layers. In a special embodiment, a relief structure can be provided in the cover film surface as an additional marking, this relief structure also being testable manually in a simple manner. It thus also constitutes an authenticity feature, thereby making it much more difficult to manipulate the card or attempt to imitate such a card by making a simulacrum counterfeit.

It has also been proposed (German patent No. 31 51 407) to provide as a recording medium in the card a synthetic layer which appears to be completely transparent when viewed visually but absorbs the light of the laser beam sufficiently so that blackening occurs in the film under the effect of the laser beam. Thus, pictures or data having a high resolution or very good letter quality can be provided in layers which are transparent as such. In spite of this high degree of protection against forgery and the relatively simple testability, there are still efforts to broaden the possibilities of designing the card with respect to its visual impression and to make it even more difficult to falsify or totally forge cards by introducing additional authenticity features which can only be imitated with great technical effort.

Thus, for example, it is known in this connection to provide light-diffractive elements such as holograms or diffraction grids in identification cards (German "offenlegungsschrift" No. 25 55 214 and European patent No. 105 099). This gives the cards optical effects which are at the same time protection against photographic or xerographic reproduction. Since the production of these holograms or diffraction grids is generally very expensive and very elaborate in terms of industrial processing, reasonable unit prices for these elements which allow for their use in identification cards are only obtained in the case of mass production with high piece numbers. However, this mass production presupposes that all holograms or diffraction grids have the same information content—predominantly in the form of an emblem or logo. The information is usually imprinted in plastic films by a stamp die. The plastic films are underlaid by reflecting layers and the surface sealed by a special lacquer due to its mechanical sensitivity. The hologram or diffraction grid produced in this way is then glued to the card surface during the manufacture of the card. However, such an element is a "foreign body" in the card structure and cannot be provided with individual data relating to the particular card due to the above-mentioned reasons of production engineering. Thus, it is basically possible to remove these elements from genuine cards which have been acquired unlawfully, for example, and transfer them to other, false cards. In spite of the great technical effort required for manufacturing holograms or diffraction grids, it is thus possible to avoid the difficult reconstruction of such elements by simply exchanging them or transferring them to other cards.

It is also a disadvantage of using holograms or diffraction grids in identification cards that good light conditions are required to test them visually. Even in normal room light the desired optical effects are only recognizable in a blur or not at all. Instead, the viewer, when testing a hologram, sees a surface which merely reflects metallically, or, when testing a diffraction grid, sees a slightly iridescent marking. Both effects can be imitated so well even using easily procurable so-called "decorating materials" that they cannot be distinguished by a layman from genuine holograms or diffraction grids under the above-mentioned unfavorable light conditions. They can therefore only be used with limitations for authenticity testing of means of payment such as credit cards, since they can only be recognized under particularly favorable light conditions.

Furthermore, in the case of imprinted holograms or diffraction grids the feature is present in a relief structure of which a cast can be made using appropriate means which can then be used to forge genuine holograms.

It has also been proposed, further, to protect proprietary articles such as phonograph records by equipping them with an authenticity mark (EP-A No. 78 320). The authenticity mark consists of a transparent film having on its surface a fine lenticular screen (cylinder lenses). These cylinder lenses have a diameter of approx. $17\mu$ and lie on a polyester layer having a thickness of $100\mu$, the back of which is provided with receiving layers for the polaroid photograph. This structure can be exposed from the front at different angles and then acquires a fine line screen on the photoelectric layer after its development. The actual picture information is brought about by modification of the structure of the lenses by imprinting the cylinder lenses in one area of the film set off from the remaining areas. These areas are shaped according to the motive to be applied.

Since the pattern is provided by partially setting off the cylinder lenses, this feature, like the above-mentioned diffraction grid, is only suitable, for financial reasons, for providing a motive which remains the same for a large series.

Due to the necessary photographic development of the photoelectric layer beneath the lenticular screen, it is further necessary to produce this element separately and mount it as a prefabricated product on the proprietary article or on a label connected to the article. It thus also constitutes a foreign body which is detachable and can thus be transferred to other articles, whereby the photoelectric layer on the back of the film makes detachment even easier.

The invention is thus based on the problem of broadening the possibilities of designing data carriers with respect to their visual impression while retaining the technological and protection-related advantages of the laser writing method, whereby the data carriers are to contain features which cannot be reproduced photographically or xerographically and which can be tested mechanically and, even under poor light conditions, visually in a simple manner.

This problem is solved by the features contained in the characterizing part of the main claim. Methods for manufacturing such data carriers and methods and apparatus for testing their authenticity are the object of further independent claims.

In an advantageous embodiment of the invention, a lenticular screen in the form of a plurality of cylinder lenses disposed beside each other with straight or non-straight cylinder axes and/or spherical lenses is imprinted into a transparent film layer of a data carrier which forms the cover film. The focal lengths of the individual lenses may also vary, for example in accordance with a predetermined pattern, or else the cylinder lenses and/or spherical lenses be disposed in a predetermined pattern. This cover film is preferably superimposed on a further transparent synthetic layer whose optical properties change under the effect of laser beams so that it blackens, for example.

Using a laser beam, information is provided through these lenses on volume areas of the data carrier located therebelow. The laser beam is held at a certain angle to the plane of the lenticular screen. When passing through the lenses the light of the laser beam is refocussed on the imprinted lenses. The change in the volume area located therebelow is restricted—presumably also due to the increase in the power density due to the refocussing of the laser beam—to a volume area which is more limited than the original beam diameter of the laser. Information provided in this way is only visible at the angle at which the laser beam hit the surface of the lenticular screen, the information being visible in a larger or smaller angle range depending on the size of the discolored volume area. In the preferred embodiment, in which films are used for recording which are transparent as such but sensitive to the laser beam, i.e. they discolor under the effect of a laser pulse with a defined pulse energy, these discolored volume areas can be produced, if the film thickness is sufficient, in the form of rods oriented in the direction of the laser beam. Such rods have at the necessary viewing angle, in spite of a small pixel size (rod diameter), a high density, which has a particularly favorable effect on the recognizability of the laser information.

Different information can thus be provided in the data carrier at different angles and viewed again separately in a clearly recognizable manner at the corresponding angles.

A piece of information provided by the laser, for example, at a perpendicular angle of incidence may be, for example, a logo, an emblem or a national ensign. A further piece of information, for example the date of validity, is provided at an angle deviation of, for example, plus 27° relative to the card normal and can be read out again at this angle. A third piece of information, which is provided in the opposite direction at an angle deviation of, for example, minus 27° relative to the normal of the data carrier, may be a piece of information which varies from data carrier to data carrier (e.g. a serial number or the account number in the case of bank-related data carriers).

The data carrier thus has an optical feature which renders different information at different viewing angles. Although the picture information is only recognizable at certain viewing angles, similar to the case of diffraction grids or holograms, the optical effect is not based on diffraction phenomena or interferences. According to the invention, the optical feature instead consists of at least one piece of information which contrasts with the surroundings and, like conventional laser writing, can be clearly tested without aids even under very poor light conditions.

By appropriately controlling the laser pulse power when writing on the film, it is also possible to enlarge the discolored volume area so that picture information can be inscribed in such a way as to be permanently recognizable regardless of the viewing angle. A combination of the effect, referred to in the following as a "tilt image", together with permanent data in the area of the lenticular screen and further user-related laser personalization data in the card area surrounding the lenticular screen field, which may have the same written form and recording characteristics, facilitates the authenticity testing and further increases protection against forgery and/or falsification. If the lasered data overlap with normal printed patterns of high production quality, for example with a guilloche background print, as disclosed in the prior art, security elements can be linked together in a manner particularly favorable in terms of protection technology.

The inventive method now makes it possible to provide a data carrier, for example an identification card, which is finished as such with a tilt image of this kind, whereby information differing from card to card can also be provided in a simple way by appropriately controlling the laser beam. By providing individual card data in this tilt image, it is card-specific as an authenticity feature, i.e. it is bound to one specific card and cannot be transferred to other cards as is the case with the above-mentioned holograms and diffraction grids. This individualization, which considerably improves protection against forgery, can be obtained virtually without any additional effort using a computer-controlled laser. The tilt image is preferably recorded at the moment when the conventional personalization is carried out so that all data are linked together reliably and correctly. This also prevents, in a simple way, the card-individual data of the tilt image from being erroneously linked to the personalization data of a different card of the production series. Since chemical developing processes and the like are completely dispensed with, the writing process is limited to one procedural step and is therefore particularly favorable in terms of production engineering. Subsequent production steps which do not rule out the destruction of the card (rejects) are also dispensed with.

If a photograph of the card user is provided instead of the logo, for example, this picture is firmly joined to the individual user-related data, e.g. the account number, and it is therefore no longer possible, either, to exchange photos between genuine and forged or imitated cards. This irreversible linkage of individual user-related data and other picture information, which can be carried out in a relatively simple manner, is particularly advantageous and greatly contributes to increasing the protection of identification cards against forgery.

This tilt image is furthermore not reproducible photographically or using copying techniques since the entire information is never present at one shooting angle. It is not possible to modify the tilt image due to the written form characteristic for the laser recorder. If the picture information is provided, for example, in the volume of transparent films, this is a further characteristic which is visually recognizable and constitutes a further obstacle for imitators since now the technical problems are so great and the required effort is out of all proportion with the possible "profit".

Both the transparent film with the imprinted cylinder or spherical lenses and the information-bearing films are preferably films located with their entire surface in the card structure, thus forming an integral component of the card. Manuipulation of the data thus generally leads to destruction of the card. If a forger should succeed in separating the layer structure in the case of a simpler card structure, he is prevented from operatively reuniting the layers by the fact that the blackening in the deeper volume areas usually extends over several layers in the form of rod-shaped pixels and these layers cannot be put back together again in such a way, if only due to the inevitable material handling during the separating and/or reuniting process, that the blackened volume areas are reconstructed in their original shapes and positions.

During such attempted manipulation, a forger is also faced with the problem that the lenticular screen must be retained both when detaching the film and when reapplying it. If the film is detached by means of a hot iron, as is usual in the case of attempted manipulation, the forger cannot avoid ironing the lenticular screen flat and warping the film so that it is not possible to reuse the film and thus the card.

The tilt image thus also protects the card against delamination of the cover layer and subsequent manipulation of an data located inside the card.

Manipulation of the lasered data themselves is not possible either since the laser causes irreversible destruction of the card material.

The tilt image may be provided in the card during the personalization process—in accordance with the teaching disclosed in German patent No. 29 07 004—using the same technology (laser writing). The dispatch of blank cards—not yet personalized cards—is uncritical since this optical authenticity feature in the form of the tilt image is not yet present in these cards and is only provided with relatively great technological effort in the last procedural step during personalization. Only when the tilt image has been provided is the card thus activated and given its "stamp of validity."

Figure 2A:
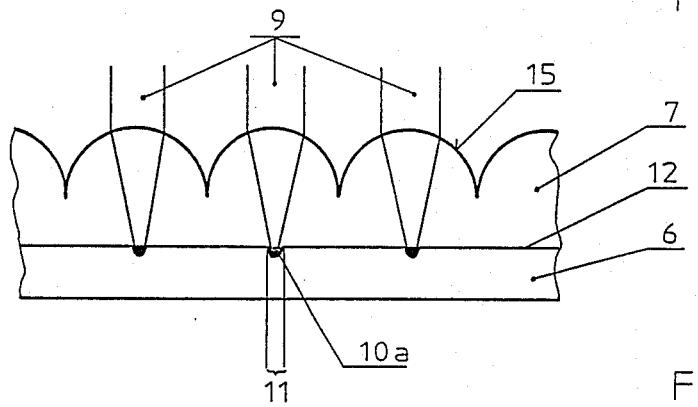
Figure 2B:
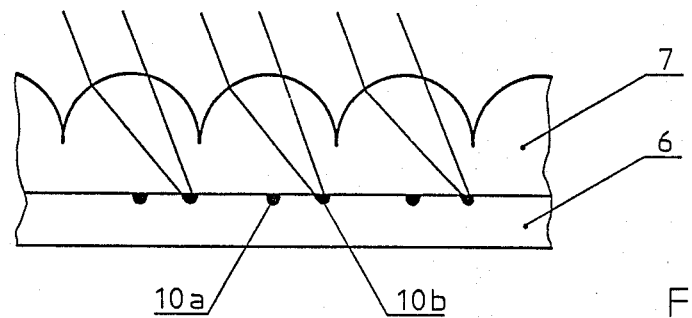
Figure 2C:
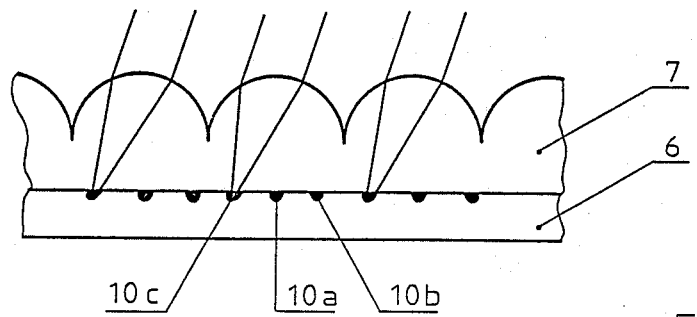
Figure 3:
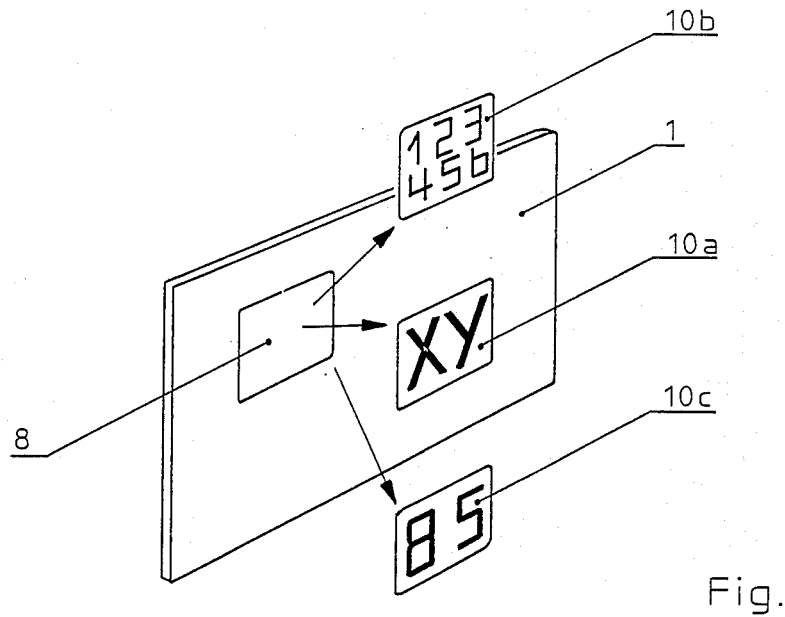
Figure 4A:
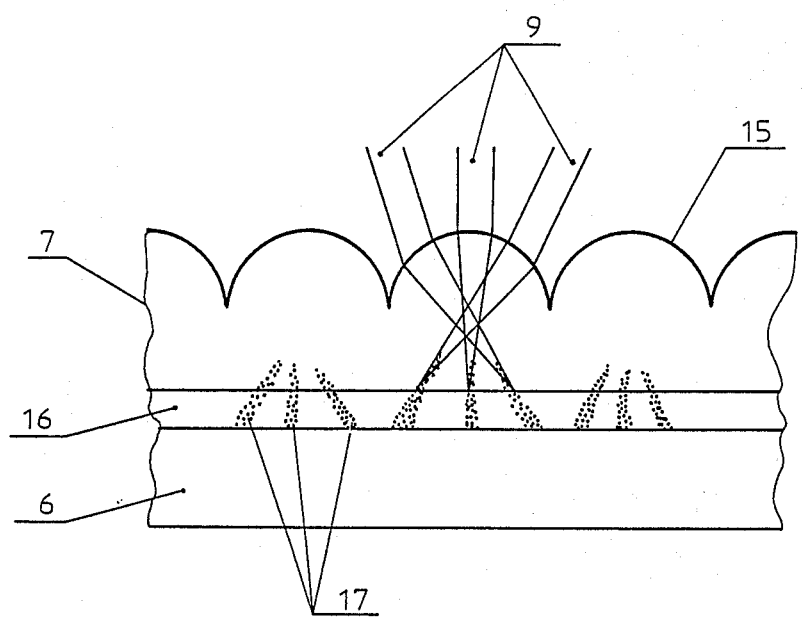
Figure 5:
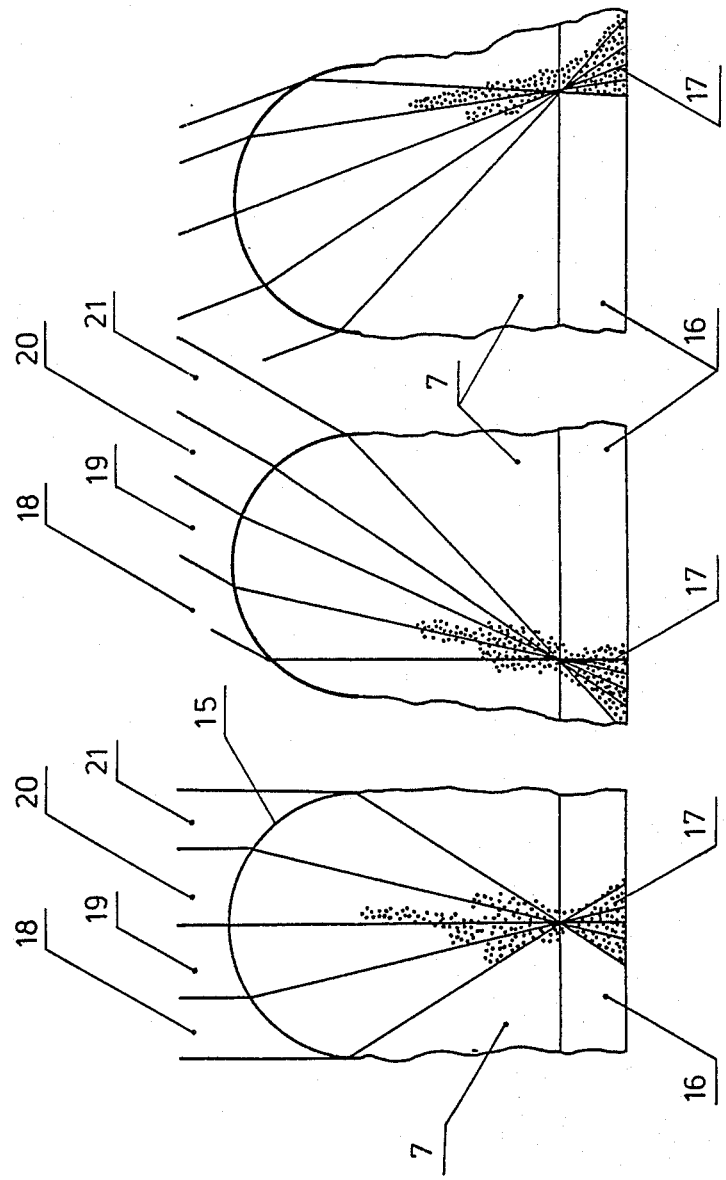
Figure 6:
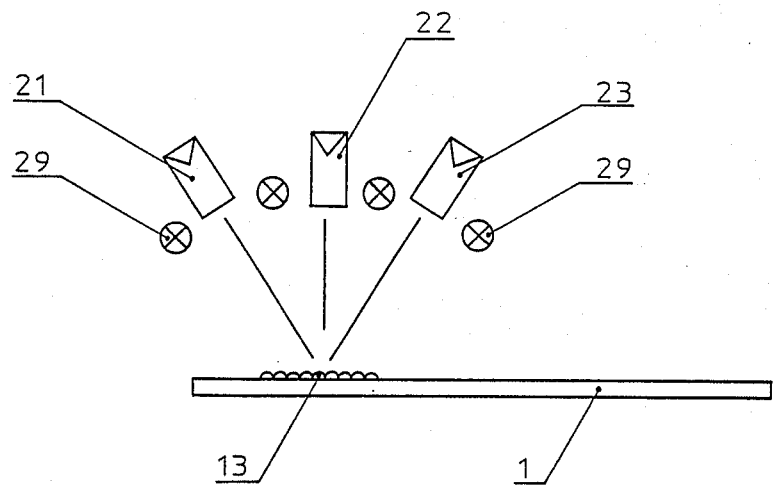
Figure 7:
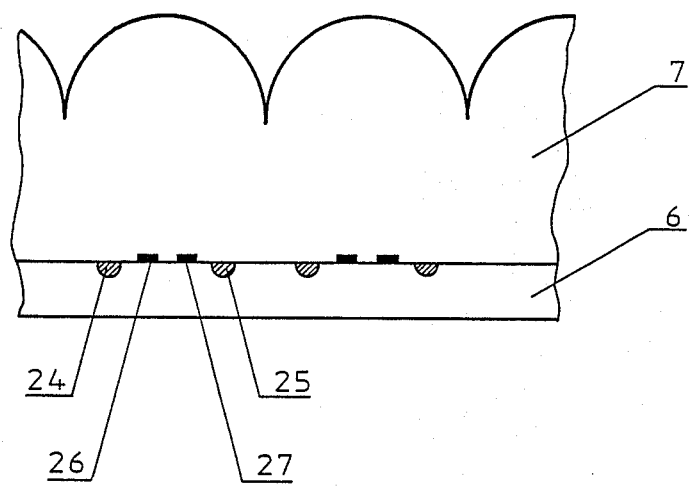
Figure 8:
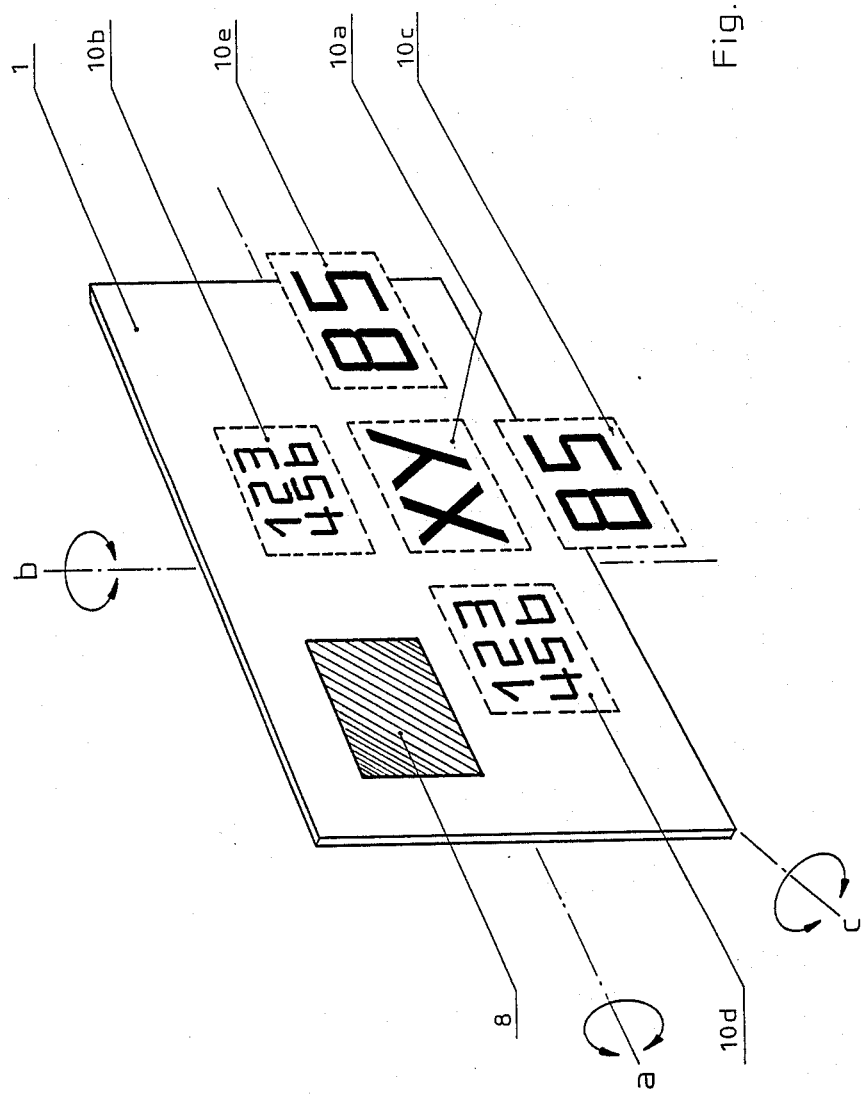

Further advantages and advantageous embodiments are the object of the following description of the invention with referenced to the figures, in which FIG. 1 is an inventive card from the front, FIGS. 2a to 2c are the individual procedural steps for providing various pieces of information, FIG. 3 is the information visible at various angles, FIGS. 4a to 4g are various embodiments of an inventive tilt image produced in a synthetic layer, FIG. 5 is the writing process by the point scanning method, FIG. 6 is a schematic view of a testing device, and FIGS. 7, 8 are further embodiments of the invention.

FIG. 1 shows an identification card 1 which is provided with the usual data such as the name of the user 2, an account number 3, a card number 4 and the information on the institution 5. User-related data 2, 3 are preferably burned by a laser into an inner volume area through a transparent cover film, while the general information such as that on the institution 5 is printed onto one of the card layers using printing techniques. In one area 8 of the card an optical authenticity feature in the form of a tilt image is provided whose structure and production shall be described in more detail below.

A card structure in a simple embodiment of such a card is shown in FIG. 2. The card comprises a core layer 6 made of paper or synthetic material, on the front and optionally the back of which information is provided printing techniques or the laser writing method disclosed in German patent No. 29 07 004. The card core may be equipped with a safety print and further safety features such as watermarks, safety threads and/or fluorescent substances in order to increase its protection against forgery.

The core layer of the card is provided at least on one side, the front, with a transparent cover layer 7. A relief structure in the form of a plurality of cylinder lenses 15 disposed beside each other is imprinted into the surface of the cover layer in one area. These cylinder lenses confine the field of vision due to the focussing and thus only stripe-shaped areas of a data-carrying layer 12 located therebelow are visible on the plane of focus of the lenses when the card is viewed at a certain angle.

Instead of cylinder lenses, other lens shapes such as spherical lenses or a mixture of different lens shapes may also be used to achieve the same effect. The cylinder lenses may also extend in curved lines. Further, it is possible without any problem, in particular for card structures in the case of which recording is performed in the volume of transparent synthetic layers, to vary the focal lengths and/or the screen period within a lenticular screen, whereby in the latter case the screen period may also be selected so as to be smaller than the lens diameter. The position of the lenses can also be varied in such a way that the apexes of lenses arranged beside each other are at different heights relative to the surface of the data carrier.

By appropriately selecting the lens shape, the arrangement of the individual lenses, the screen period, etc., the lenticular screen can be designed in a form typical for a special type of card, whereby selectively predetermined patterns can also be provided.

In this case the lenticular screen itself, due to its specific relief structure, is already an authenticity feature which can be tested visually and/or mechanically. Furthermore, this constitutes a further obstacle for the forger since he might now be forced to reconstruct the lenticular screen specially produced for a certain type of identification card or application.

Suitable materials for the transparent layer provided with the lenticular screen are, for example, synthetic materials which are permeable for the laser beam at least up to certain intensities, such as commercial PVC films. These films are advantageous in that they can be joined well to other synthetic films or paper layers of the card, for example by applying heat and pressure. The individual card layers are placed between two heated laminating plates and connected under pressure to form a unit. The lenticular screen can be imprinted during this laminating process by working a negative of the lenticular screen into the corresponding laminating plate. A thermostable imprinting die can also be used, which is placed between the transparent cover layer and the laminating plate.

However, it is also quite possible to laminate the card by the conventional method and then apply the lenticular screen by means of a press die or a press roller.

The lenses (cylinder or spherical lenses) preferably have a width or a diameter of 400μ, and an overall thickness of approx. 350 μm is preferably selected for the transparent imprinted layer.

Information is provided in the card by means of a preferably pulse-operated laser, e.g. an ND-YAG laser, laser beam 9 being directed onto the lenticular screen at certain angles. A first piece of information, e.g. in the form of a logo, an emblem or a photograph of the card user, is provided at a perpendicular angle of incidence (FIG. 2a). The data recording is preferably performed by the point scanning method. The lenticular screen is scanned point by point by the laser beam and the intensity of the laser pulses is modulated according to the picture information. The resulting picture is thus composed of individual screen points, so-called pixels.

When the laser beam passes through the cylinder lenses, the beam is effectively refocussed. The writing is therefore limited to narrow stripe-shaped areas 11 located below the centers of the individual lenses. The information is then present in the form of individual stripe images, the stripes being formed by a sequence of separate pixels. By appropriately selecting the card structure, the layer materials, their thickness, the lenticular screen structure and the laser parameters, the change in the card material caused by the laser radiation can be selectively influenced in its shape and position. In the embodiment shown in FIGS. 2a to c, the above-mentioned parameters were selected in such a way—also in order to simplify the representation—that the change of material is limited to the surface area of the card core layer. In many cases such a sharp limit may not be attainable, however. Instead, an optically recognizable change of material will result over a relatively large depth, whereby adjacent layers, e.g. the cover layer, are also changed locally, presumably due to the increased energy density in the refocussed area of the laser beam. This is not a disadvantage, however, but an advantage, since it means that manipulation by which the layers must be separated and then reunited does not lead to the desired goal, as explained above. When this first piece of information has been provided the card is tilted to one side by a certain angle, for example 27°, or the angle of incidence is changed accordingly by prisms placed in the beam (FIG. 2b), and a second piece of information, which fixes the period of validity of the card, for example, is provided in the same way in the form of a stripe image 10b. The card is then tilted to the other side, preferably by the same angle deviation from the card normal, and a third piece of indeviation formation (stripe image 10c, FIG. 2c) is provided. This piece of information may, for example, contain card-specific information such as the account number.

When the tilt image is then viewed, only the information represented by stripe image 10a is visible at a perpendicular viewing angle, while the second and third pieces of information, formed by stripe images 10b and 10c, respectively, are visible when the data carrier is viewed from the side, or tilted. If the card is tilted even further these pieces of informations disappear again and, after the card is turned further in the same direction, the adjacent stripe image actually belonging to the particular adjacent cylinder lenses can appear in one's field of vision. Thus, another change of information takes place. If the card is tilted further in the same direction after the second piece of information is viewed, for example, the third piece of information appears after a certain angle of rotation since this stripe image now comes into one's field of vision.

Normally, the images would fall out of the available depth of field of the laser durung recording due to the tilt of the card. But the cylinder lenses refocus so that there is in any case focussing in the card, dependent on the writing angle, but in different depths. This is not recognized by the viewer so that no differences of focus can be detected anywhere in the area of these logos. The relatively great line thickness with which the laser records in the material also means that it is not disadvantageous that the laser beam does not hit every area of the image at exactly the same angle when it is directed across the lenticular screen by rotation of the deflecting mirrors. Each lens is thus hit at a slightly different angle than the preceding lens.

Although the individual pieces of information are present in a mixed arrangement, they are visible separately at the corresponding viewing angles. FIG. 3 shows in a three-dimensional view the various images visible at the various angles. The pieces of information may be completely independent of each other, as in the above-mentioned example, or have a certain relationship to each other. Thus, for example, an individual motive may be shown in a slightly modified form (e.g. different views) at each recording angle. It is also possible to provide markings in such a way as to create the impression of a moving image when the card is tilted.

A marking is provided, for example, at one end of the lenticular screen, beginning at a recording angle of approx. 30° to the card normal. During the scanning of the lenticular screen by the laser beam in the transverse direction to the lenses, the recording angle is continuously changed in one direction or in fixed steps. The position of the marking in the data receiving layer is thus shifted with respect to the positions of the centers of the cylinder lenses, so that when the card is viewed—slightly tilted—the impression arises that the marking moves from one end of the lenticular screen to the other end.

The inventive way of providing various pieces of information which are visible at different angles can also be used to produce images which convey a three-dimensional impression to the viewer. For example, two views of a motive, photographed in accordance with the eye geometry, are recorded at the corresponding angles through the lenticular screen so that when the image is viewed one partial image appears at the viewing angle of the left eye while the other appears at the viewing angle of the right eye. For the viewer, the two partial images combine to form an image with a three-dimensional effect.

The laser data can be recorded in different ways. The data-carrying layer may be constituted, for example, as shown in FIG. 2, directly by card core layer 6 provided with the safety print and possibly with further data, whereby the safety print, which is preferably designed aperiodically from card to card, can also extend into the area of the lenticular screen. This safety print is visible there—through the lenticular screen—in an incomplete and distorted form, but it is visible at all viewing angles.

The lenticular screen can also be designed in the edge areas in such a way that the relief structure runs almost fluidly into the smooth surface area of the card. This makes it even more difficult to detach the tilt image and transfer it to a forged card. Patterns, e.g. guilloches, may also be provided by the laser in the boundary area of the lenticular screen and the surrounding unimprinted card area, however, which makes the inventively produced tilt image fuse with the card even further.

The core layer is preferably a colored synthetic layer or a paper layer, which is discolored, for example blackened, under the effect of the laser light.

In a further possible embodiment, an additional data receiving layer which absorbs the laser light well is provided between the core layer and the transparent cover layer in which the lenticular screen is imprinted.

For this purpose, the core layer is coated, e.g. in the area of the lenticular screen, with suitable materials such as metals, layers of color, etc. Materials suitable for laser recording are disclosed, for example, in U.S. Pat. No. 4,032,691. Further suitable substances based on aluminum are stated, for example, in German "offenlegungsschrift" No. 33 11 882. These layers also allow for motives to be shown in different colors if the laser intensity is controlled appropriately.

FIG. 4 shows a particularly advantageous embodiment. An additional transparent synthetic layer 16 is provided between the film with lenticular screen 7 and core layer 6, said additional layer having relatively high absorptive power for the light of the particular laser used. Such synthetic layers are disclosed in German patent No. 31 51 407 and German "offenlegungsschrift" No. 34 25 263. They contain additives, e.g. in the form of dyes, which are provided in such an amount that they barely impair the visual transparency but have the effect of absorption centers for the laser beam and cause blackening in the synthetic film.

The thickness of this layer and the thickness of the cover layer permeable to the laser beam are coordinated with each other in such a way that the plane of focus of the lenses falls into the transparent film area.

The film preferably corresponds to the outer dimensions of the card and is integrated over its entire surface into the card compound. Due to its transparent properties the data and information on layers therebelow are still visible.

The film is preferably made of PVC, since it can be welded particularly well to the adjacent layers under the effect of heat and pressure. The film may also be one layer of the cover film which is designed, for example, as as composite film, comprising an outer layer not sensitive to laser recording and an inner layer sensitive to laser recording. The latter can then have a particularly thin design, mechanically stabilized by the other film.

If a transparent synthetic film capable of being written on by a laser is used as a "data receiving layer," pixels 17, i.e. the blackened areas, are formed differently in the volume of the film depending on the depth of this layer in the card compound, when the synthetic film is written on.

FIG. 4b shows a summary representation of the blackenings to be expected in a sensitive film in accordance with its embedding at various depths, at a given lens diameter of 400$\mu$ and a refractive index of 1.5. If it is embedded close to the surface, here up to a depth of approx. 350$\mu$, the partial images or their pixels (33, 34, 35) provided at three different angles (30, 31, 32) would overlap. Below this depth, however, the pixels are present separately and the various partial images are visible separately without the influence of adjacent pixels (see FIGS. 4e–4g) In a preferred embodiment, film thicknesses of the insensitive, imprinted cover films and the sensitive film therebelow are selected in such a way that rodshaped (FIG. 4f) or slightly conical (FIG. 4g) pixels are formed which are oriented in the direction of the incoming laser beam. This means that in the case of laser parameters as shown in FIG. 4b the laser-sensitive film which is 100$\mu$ thick, for example, is embedded at a card depth between about 350 and 600$\mu$. The resulting partial images are separate from each other and thus clearly visible separately. The rods are composed of individual, microscopically small black areas which are formed due to the locally limited disintegration of the synthetic material. The rods may also continue into the cover film, as shown in FIGS. 4a and 5. Due to the refocussing, the power density of the laser beam, in particular in the vicinity of the focus area, is usually sufficient to cause an optical change even in the cover film, which is not sensitive as such.

When these images are viewed through the cylinder lenses these rods are always regarded perpendicularly at the various angles. The rods themselves are not completely blackened but they produce the optical density which appears as blackening along their length of several 100$\mu$ (depending on the laser pulse energy, the lenticular creen focus, the sensitivity and thickness of the films used). For this reason, the individual images are clearly visible even when the rods belonging to different partial images happen to touch each other. The degree of blackening can be adjusted in these films in a simple and reproducible form by controlling the laser intensity or the pulse power, so that it is also possible to represent half-tone images.

The rods which do not belong to the particular partial image are not oriented in the direction of the viewing angle in question, so that they can only be viewed from the side in case they overlap. However, in the case of side viewing the optical density is much lower and it is therefore not disturbing.

If the laser intensity is higher, the rods are broader. This broadening has the consequence that the information is visible in a larger angle range. One thus has the possibility, by simply controlling the laser intensity, of providing information which can only be read out in a narrow angle range, and other information which is visible in the extreme case from almost every viewing angle. Thus, for example, those image parts which are common to all partial images, such as a frame, can be provided in one working step at one angle with increased laser intensity, while the various pieces of information are provided at the particular angles with accordingly lower laser intensity. This reduces, relative to all partial images, the number of laser pulses required for recording and thus also the writing time required to form the tilt image.

However, the picture information can also be provided directly on the film bearing the lenticular screen. For this purpose, a film is selected which is only slightly sensitive to the laser beam and in which blackening only takes place when the laser beam is focussed additionally, as it is here by the cylinder lenses. In the focus area, the power density is so high that disintegration of the synthetic material takes place, while outside the focus the power density is not sufficient to disintegrate the material.

Lasers with a high power output are generally required to blacken synthetic films in their volume. A suitable laser is, for example, an ND-YAG laser working in pulse operation with peak pulse outputs between $10^4$ and $10^5$ watts at a wavelength of $1.064\mu$.

The pulse operation makes it obvious to record the picture information in the form of a point screen, each picture point corresponding to a laser pulse. If the information is provided through the lenticular screen, as intended by the inventive method, it must generally be expected that the scanning across the various lenses must be synchronized with the pulse frequency of the laser since otherwise irregularities occur in the degree of blackening depending on whether the laser pulse hits the following lens or not. However, such synchronization would be very elaborate technically and can be avoided, as shown in the following, by properly coordinating the parameters beam diameter, lens width, scanning speed and pulse frequency (FIG. 5).

Laser beam 9 is dimensioned for this purpose in such a way that its diameter, when it hits the lenticular screen, is only a fraction of the width of individual lenses 15, preferably smaller than ⅓ of the lens diameter when three tilt images are being provided. The scanning speed and the pulse frequency are then selected in such a way that, when the lenticular screen is swept, several, e.g. four, laser pulses 18, 19, 20, 21 hit each lens. Each pixel 17 is therefore produced by at least two successive laser pulses. If in this example the first laser pulse 18 does not fall exactly on the beginning of the lens, its energy is divided up over two lenses and the resulting power density does not suffice for noticeable blackening, even in the sensitive layer. The second, or following, pulses hit the lens completely and cause sufficient blackening of the pixel. In this way moires are also prevented which come about in the case of unsynchronized recording.

Providing the information by means of a laser beam through the lenticular screen is also advantageous in that the demands on the optical quality of the lenticular screen are relatively unimportant. Local defects in individual lenses which, for example, lead to the laser beam being deflected differently than by the adjacent lenses, and thus to a shift of the recording point, are irrelevant since the light path is identical during recording and during subsequent viewing. For the same reason it is possible without any problem to vary the lens shape, lens arrangement, focal lengths and/or screen period, as well as further parameters within a lenticular screen.

Local lens defects or selective local changes thus also contribute to the protection of the card against falsification. If, during manipulation, the lenticular screen is destroyed and replaced by a new one, the manipulation is recognizable even if the forger succeeds in providing a similar lenticular screen which registers exactly over the lasered data. A shift of the recording points due to lens defects is then no longer compensated by the replaced lenticular screen and the observed picture loses its original focus. If the transparent synthetic layer is used the rods are then no longer observed exactly on their longitudinal axes with the maximum optical density but at an angle to the longitudinal axis, so that the image shows local differences in the degree of blackening.

Transparent synthetic layers as "data receiving layers" are advantageous over a special coating on the core layer in that the individual card layers are welded together homogeneously to the same extent over the entire surface and the layers cannot be separated again. A coating on the core layer in the lenticular screen area, on the other hand, generally requires additional measures in order to obtain a firm bond between the individual layers in this area as well.

Furthermore, a printed pattern possibly located below the lenticular screen or extending thereinto is still visible on the core layer of the card. Identification cards are generally provided with a background pattern, the position of the motive varying aperiodically from card to card. If the background pattern extends into the lenticular screen area, this measure here too prevents a punched tilt image from being successfully transferred onto other cards, since the background patterns of different cards are only present in a precisely fitting manner in the most exceptional cases.

FIG. 6 shows a schematic representation of an apparatus for mechanically testing the inventive tilt image contain-contains three partial images which are visible in the direction of the card normal and at angular distances of approx. plus 27° and minus 27° to the card normal.

The testing device has three photodetectors 21, 22, 23 consisting of a plurality of individual photodiodes and forming a photosensitive receiving surface. The detectors are directed at different angles (0°, +27°, −27°) at tilt image 13 located in card 1. An appropriate screen arrangement or additional optical elements (not shown in the figure) can be used to ensure that the detectors only receive the light of a narrow angle range and the field of view of the detectors is limited to tilt image 13 located in the testing device. The device also comprises light sources 29 which illuminate the tilt image. The signals obtained from the individual photodiodes of each detector arrangement are added up electronically. Since the picture information is different in the various directions, three different measured values A (detector 21), B (detector 22) and C (detector 23) are thus obtained. These measured values are standardized in a data processing means, e.g. the quotients A/(A+B+C), B/(A+B+C) and C/(A+B+C) are detected in order to obtain a signal independent of the total brightness. The measured values thus obtained are then compared with the corresponding values present in a storage unit. Since the tilt image contains card-individual information in at least one partial image, the measured values will always be different from image to image and from card to card. If the comparative values are stored directly on the card, e.g. on the magnetic track or in the form of a different, mechanically readable code of a known type (OCR code, bar code), an additional binding of these values to the card is obtained. Furthermore, the testing of the card can take place by direct comparison of the measured data with the data stored on the card, thereby making it possible to dispense with additional central storage units, etc.

If only the partial images with standard information are used when testing the tilt image, the comparative values may also be permanently stored in the testing device.

Instead of an integral measurement, the tilt image can also be scanned line for line from the various directions and compared with corresponding values. If the information such as the account number is provided in a mechanically readable code (e.g. in OCR coding) the characters can also be read directly and thus tested.

FIG. 7 shows a further embodiment of the invention. The inventive tilt images 24, 25 are combined with tilt images 26, 27 provided by printing techniques or with a 3D image consisting of two images. Images 26, 27 are provided in such a way as to be visible when the card is viewed almost perpendicularly, e.g. at plus 8° and minus 8°. If the card is tilted further in one direction or the other, laser tilt images 24, 25 are recognizable. Tilt images 26, 27 can be produced in any colors desired, since they are produced by conventional printing techniques. It is unfavorable from the point of view of industrial processing to vary these images 26, 27 from card to card. Therefore, it makes sense to use them to represent information which is the same in all cards, e.g. logos, the year, etc. The card-individual data are provided by the laser technique mentioned at the outset. If this is done with color contrast, e.g. in black, the transition of images 26, 27 to images 24, 25 can be recognized particularly well.

It is possible to produce the cards shown in FIG. 7 similarly to the cards mentioned at the outset. The lenticular screens are also imprinted with the aid of laminating plates during the laminating process. Images 26, 27 are provided, for example, together with the general printed pattern (background pattern, guilloches, etc.). When the laminating plates are brought together with the printed inlays (core layer 6) one must only make sure that register marks provided on the printed sheet correspond exactly to register marks on the laminating plates. If this is the case the parallel lenses of the lenticular screen are automatically parallel to the lines of printed patterns 26, 27. When the cards have been punched out, the register marks are no longer available so that a forger is not given any help and the problems mentioned at the outset still exist unchanged for any manipulation.

However, the printed pattern may also be printed onto the subsequently inside surface of the cover film before the card is produced, and the lenticular screen imprinted so as to register exactly with the printed pattern, or one may proceed in the opposite way (imprinting - printing).

The card shown in FIG. 7 is also advantageous in that different technologies (laser technology and printing technology) are united in a visually testable card feature, which further increases the possibilities of variation, on the one hand, and the protection against forgery, on the other.

However, it must be taken into consideration in this embodiment that the printed pattern only "tilts" if it is disposed on the plane of focus of the lenses of the lenticular screen or at least in the vicinity thereof. The thickness of the cover film or the position of the printed pattern must therefore be selected in accordance with the focal length of the lenses. It must also be heeded that a blackening caused by the laser beam and continuing in the cover film does not overshadow the printed pattern produced by printing techniques. Such problems may also be avoided by using relatively insensitive cover film materials, low laser intensities possibly in combination with a coating of the card core with laser-sensitive material.

However, if a card structure as shown in FIG. 4 is used, in which the laser recording takes place in the volume of a transparent synthetic layer, it is optionally possible to provide an additional tilt image produced by printing techniques by providing the printed pattern between the transparent films. In order to avoid heat-related laminating problems and further problems which may occur when applying the lenticular screen so as to register exactly with the printed pattern, the cover film may also be prefabricated with the lenticular screen, the printed pattern printed onto its opposite side in alignment with the lenticular screen, and the film connected with the other card layers by the cold laminating method using appropriate adhesives which adhere well but do not interfere with the lasering.

A high degree of protection against forgery, however, is only obtained by using a laser for recording the tilt image, in particular in combination with the recording in the volume of transparent card layers, for only this offers the possibility of linking simple production with a high degree of protection against forgery and falsification. The following aspects are particularly valuable for the protection against forgery and for the production engineering:

card-individual data can be provided easily by controlling the laser, making it pointless to transfer a tilt image from a genuine card to a false card the data are provided simultaneously in several layer areas so as to register exactly due to the industrial processing, so that manipulation by which the card layers are separated to obtain access to the data is recognized immediately the information is provided below the lenticular screen without any register problems, whereby this may be done in the finished card the card material is changed irreversibly by the laser, making it impossible to make any subsequent changes, i.e. falsify the data striking and unusual lenticular screens, such as a combination of cylinder lenses and spherical lenses, may be used without any problem. Spherical lenses can be used, for example, to give the edge area of the tilt image a decorative and striking design. A forger wanting to prepare a simulacrum counterfeit is therefore forced to make a special imprinting screen for each type of card; he cannot resort to the known postcards having a lenticular screen tilt image. The trouble of reconstructing the unusual and striking lenticular screen is therefore itself an effective barrier against imitations.

lenticular screens are used having lenses with different focal lengths, causing unsurmountable problems for the production of imitations using printing or photographic techniques. The tilt effect is only present in these imitations if the recording of the partial images comes to lie in the plane of focus of the lenses. A forger is therefore forced to perform the recording of the partial images in a three-dimensional form. Since the tilt image produced by the laser is preferably recorded in the form of rod-shaped volume elements, however, it does not involve this difficulty when recording is performed through lenticular screens with different focal lengths. Due to the rod geometry, by the way, the areas under the spherical lenses also tilt only perpendicular to the direction of recording. it is possible, by suitably selecting the recording geometry and arranging or shaping the lenticular screen, to obtain a tilt effect, i.e. a change of information when the card is tilted, which can be observed not only when the card is rotated about one predetermined axis of rotation, but also when the card is rotated about other axes of rotation. FIG. 8 shows, for example, a lenticular screen in which the cylinder lenses extend at an angle of 45° to the longitudinal axis of the card. The partial images (10a, b, c) are provided by line-by-line scanning of lenticular screen area 8 of the card, the scanning being performed in the direction of one edge of the card. The various partial images are provided, as described above, at different recording angles. In the arrangement shown here, however, the laser beam, during recording, does not sweep across the cylinder lenses perpendicularly to their longitudinal axes, but at an angle of 45°. The partial images provided in this way are then alternatingly visible when the card is turned both about its longitudinal and transverse axes (a, b) and about an axis extending collinearly to the card diagonal and perpendicularly to the longitudinal axes of the lenses.

Such an effect is obtained as soon as the laser beam is no longer directed across the lenticular screen at right angles to the longitudinal axes of the cylinders, but at an angle between 10° and 80°, whereby partial images 10a–10e visible from the various viewing directions, can be observed sharply separate from each other in particular at an angle of 45°, as in the example shown in FIG. 8. Since it is not necessary to align the lenses to the scanning direction exactly at 45°, curved, arcuate or similarly shaped cylinder lenses or other lens shapes may also be used to achieve the same effect. It is further possible to align the lenses differently, e.g. in the form of a herringbone pattern, in different areas of the lenticular screen.

All these points contribute either individually or in combination to make it possible to provide data carriers, such as identification cards, in a simple way with an easily testable authenticity feature which is difficult or virtually impossible to imitate and cannot be reconstructed by copying or photographic techniques. However, it is particularly advantageous that the inventive solution provides a simple way of firmly linking standard information (logo, national ensign, etc.) with card-individual information (photo, account number, etc.). In the same way, further data can also be included, such as the period of validity or certain information designating the series of cards.

We claim:

1. A data carrier in which information is provided by means of a laser beam in an inside volume area, said information being visible in the form of changes in the optical properties due to an irreversible change of material caused by the laser beam, characterized in that the data carrier contains at least one transparent synthetic layer (7) which is provided at least in one area with a surface relief in the form of a lenticular screen (15), in that at least part of the information provided by the laser beam is provided through this lenticular screen, in that the change in the optical properties is limited to areas (pixels) whose radial extent is smaller than the diameter of an individual lens, so that they are only visible in very limited angle ranges due to the optical effect of the lenses, and in that pieces of information which belong together and extend over the lenticular screen area, and are recorded using laser beams from a very limited angle range, can then be read and/or detected by measuring techniques in the very limited angle range.

2. The data carrier according to claim 1, characterized in that the lenticular screen consists of cylinder lenses.

3. The data carrier according to claim 1, characterized in that the lenticular screen consists of spherical lenses.

4. The data carrier according to claim 1, characterized in that the lenticular screen consists of a mixture of cylinder and spherical lenses.

5. The data carrier according to claim 4, characterized in that the lenses are disposed in the form of a pattern which is recognizable tactilely and visually.

6. The data carrier according to claim 1, characterized in that information details can be provided in such a way, with the aid of suitably wide pixels which are visible in a larger angle range, that these details can be read out in different directions.

7. The data carrier according to claim 1, characterized in that several pieces of information (10a, 10b, 10c) capable of being read out at different angles are recorded below the lenticular screen.

8. The data carrier according to claims 7, characterized in that the data (10a, 10b, 10c) recorded below the lenticular screen are present in the form of a mixed image consisting of pixels in such a way that linear pixel sequences extending parallel to the longitudinal axes of the lenses belong to one partial image and adjacent pixels at right angles to longitudinal axes of the lenses belong to a different partial image.

9. The data carrier according to claim 7, characterized in that the pieces of information (10a, 10b, 10c) are standard information such as logos, marks of validity, etc., and data specific to the data carrier such as an account number, card number, etc.

10. The data carrier according to claim 1, characterized in that a transparent film (12) capable of being written on by a laser is provided between the film (7) bearing the surface relief (15) and a core layer (6).

11. The data carrier according to claim 10, characterized in that the films (7, 12) are designed as a compound film.

12. The data carrier according to claim 10, characterized in that the film (12) capable of being written on by a laser has dyes mixed therein which are evenly distributed in the film mass.

13. The data carrier according to claim 10, characterized in that the optical changes in volume areas of the transparent films are present in the form of rod-shaped pixels oriented in the direction of the beam.

14. The data carrier according to claim 4, characterized in that the lenses of the lenticular screen have different focal lengths.

15. The data carrier according to claim 1, characterized in that the screen period of the lenticular screen is smaller than the lens diameter.

16. The data carrier according to claim 1, characterized in that the screen period is different in different areas of the lenticular screen.

17. The data carrier according to claim 1, characteried in that the lenticular screen consists at least partially of cylinder lenses having non-straight cylinder axes.

18. The data carrier according to claim 1, characterized in that the apexes of the lenses disposed beside each other are at different heights, relative to the surface of the data carrier.

19. The data carrier according to claim 1, characterized in that the lenses (15) have a lens diameter between 150μ and 50μ.

20. The data carrier according to claim 1, characterized in that a surface imprinting is present in the transitional area between the lenticular screen and the unimprinted data carrier surface.

21. The data carrier according to claim 20, characterized in that the lenticular screen runs continuously into the surface imprinting.

22. The data carrier according to claim 1, characterized in that a pattern, e.g. a guilloche, recorded by means of a laser is provided in the edge area of the lenticular screen.

23. The data carrier according to claim 1, characterized in that further information provided by printing techniques is provided at least in one area of the surface relief (15).

24. The data carrier according to claim 23, characterized in that the information provided by printing techniques is an aperiodic background pattern.

25. The data carrier according to claim 24, characterized in that the background pattern continues in the areas of the data carrier outside the lenticular screen area.

26. The data carrier according to claim 23, characterized in that the background pattern is a pattern of high protection quality, preferably a guilloche pattern.

27. The data carrier according to claim 23, characterized in that the information (26, 27) provided by printing techniques is provided, in terms of the position and shape of the lenses in the lenticular screen, in such a way that it is visible only in very limited angle ranges.

28. The data carrier according to claim 27, characterized in that this information contains two images designed in accordance with the eye geometry and adapted to the lenticular screen which arouse a three-dimensional impression when viewed simultaneously.

29. A method for providing information in a data carrier comprising a carrier layer and a transparent synthetic layer, by means of a laser beam, characterized in that the transparent synthetic layer is provided at least in one area with a surface relief in the form of a lenticular screen at least part of the information is provided by the laser beam through the lenticular screen at a predetermined angle, whereby the laser beam causes an irreversible, optically recognizable change in an inside volume area of the data carrier, and this change is limited to an area narrower than the lens diameter so that this information can only be read out again in very limited angle ranges corresponding substantially to the angle ranges at which the information was provided by the laser beam.

30. The method according to claim 29, characterized in that a lenticular screen comprising a plurality of cylinder and/or spherical lenses is provided.

31. The method according to claim 30, characterized in that the laser beam is directed across the lenticular screen at right angles or at an angle between 10° and 80°, preferably 45°, to the path of the cylinder lenses.

32. The method according to claim 29, characterized in that different information is inscribed by the laser at different writing angles.

33. The method according to claim 32, characterized in that the writing angle is changed by rotating the data carrier by the corresponding angle to the optical axis.

34. The method according to claim 32, characterized in that the writing angle is changed by directing the laser beam across prisms and by the arrangement of the prisms determining the writing angle.

35. The method according to claim 32, characterized in that a first piece of information is provided with laser beams hitting the data carrier surface at right angles (=0°), a second is provided with laser beams incident at an angle between plus 10° and plus 35°, and a third is provided at an angle between minus 10° and minus 35°.

36. The method according to claim 32, characterized in that several pieces of information are provided by the laser with the same angular distance steps and the pieces of information have a relationship to each other such that they run into each other quasi continuously when the card is tilted.

37. The method according to claim 29, characterized in that the information is provided by the point scanning method and the information is composed of individual elements, so-called pixels.

38. The method according to claim 37, characterized in that the scanning speed and the pulse frequency of the laser are coordinated with each other in such a way that, when sweeping over the lenticular screen, a plurality of laser pulses hits each lens per pixel.

39. The method according to claim 37, characterized in that the layer structure and the materials used therefor are selected in such a way that the optical changes are effected in volume areas of the transparent layer areas of the data carrier, whereby rod-shaped pixels form.

40. The method according to claim 39, characterized in that the pulse power of the laser beam recorder is adjusted in such a way that the rod-shaped pixels overlap each other only slightly in their volume.

41. The method according to claim 39, characterized in that the laser is additionally used to provide information in which the radial diameter of the pixels is widened to such an extent by appropriate control of the laser pulse power that the pixel is recognizable in a large angle range and optionally in all viewing directions.

42. The method according to claim 29, characterized in that in the area of the surface relief, in addition to the information to be inscribed by the laser beam recorder, further printed information is provided which is disposed and designed in cooperation with the lenticular screen in such a way that at least parts of this information are also visible only in certain very limited angle ranges.

43. A method for testing a data carrier in which information is provided by means of a laser beam in an inside volume area, said information begin visible in the form of changes in the optical properties due to an irreversible change of material caused by the laser beam wherein the data carrier containing at least one transparent synthetic layer which is provided at least in one area with a surface relief in the form of a lenticular screen, at least part of the information provided by the laser beam is provided through this lenticular screen, the change in the optical properties is limited to areas (pixels) whose radial extent is smaller than the diameter of an individual lens, so that they are only visible in very limited angle ranges due to the optical effect of the lenses, and pieces of information which belong together and extend over the lenticular screen area, and which are recorded using laser beams from a very limited angle range, can then be read and/or detected by measuring techniques in the very limited angle range, characterized in that the data carrier is illuminated in the area of the lenticular screen in different angle ranges, the light remitted from the data carrier area in which the lenticular screen is located is evaluated by a plurality of detectors each of which detects light only in one certain angle range, the signals obtained from the detectors are fed to a data processing means, processed there and compared with stored values.

44. The method according to claim 43, characterized in that the data carrier is scanned in the lenticular screen area line by line at the various angles.

45. The method according to claim 43, characterized in that the light remitted at the various angles is detected integrally over the entire lenticular screen area, angle-specific integral measured values are formed, these measured values are standardized by quotient formation, and the standardized values are compared with stored values.

46. An apparatus for carrying out the method according to claim 43, characterized in that the apparatus has a plurality of lighting sources (29) for illuminating the lenticular screen located on the data carrier to be tested, the apparatus has a plurality of photodetectors (21, 22, 23) pointing at different angles at the data carrier (1) to be tested, and the photodetectors (21, 22, 23) are connected via a signal line with a data processing means in which the measured values are processed and compared with stored values 47. The apparatus according to claim 46, characterized in that the photodetectors (21, 22, 23) comprise one or more individual photodiodes disposed on one surface or in a line.

* * * * *